(12) United States Patent
Ehlert et al.

(10) Patent No.: US 11,937,525 B2
(45) Date of Patent: Mar. 26, 2024

(54) AGRICULTURAL COMBINATION WITH A TRACTIVE MACHINE AND A PLOW

(71) Applicant: CLAAS Tractor SAS, Vélizy-Villacoublay (FR)

(72) Inventors: Christian Ehlert, Bielefeld (DE); Jan Carsten Wieckhorst, Paderborn (DE); Jona Pieper, Nordkichen (DE); Christian Birkmann, Versmold (DE); Jens Heydekorn, Harsewinkel (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 467 days.

(21) Appl. No.: 16/993,323

(22) Filed: Aug. 14, 2020

(65) Prior Publication Data

US 2021/0045280 A1 Feb. 18, 2021

(30) Foreign Application Priority Data

Aug. 16, 2019 (DE) ..................... 10 2019 122 116.1

(51) Int. Cl.
*A01B 69/00* (2006.01)
*A01B 59/042* (2006.01)
(Continued)

(52) U.S. Cl.
CPC .......... *A01B 69/004* (2013.01); *A01B 59/042* (2013.01); *A01B 63/008* (2013.01); *A01B 63/245* (2013.01); *A01B 63/28* (2013.01)

(58) Field of Classification Search
CPC ... A01B 69/004; A01B 59/042; A01B 63/008; A01B 63/245; A01B 63/28
See application file for complete search history.

(56) References Cited

U.S. PATENT DOCUMENTS 10,085,372 B2 10/2018 Noyer et al.
10,462,957 B2 11/2019 Clement et al.
(Continued)

FOREIGN PATENT DOCUMENTS

DE 102016118205 A1 11/2017
EP 3243367 A2 11/2017
(Continued)

OTHER PUBLICATIONS

European Search Report dated Nov. 10, 2020 issued in the corresponding European Application No. EP 20 16 9746 (with English translation of relevant parts).

*Primary Examiner* — Tara Mayo
(74) *Attorney, Agent, or Firm* — Lempia Summerfield Katz LLC (57) ABSTRACT

A combination of a tractive machine and plow, has a driver assistance system having an input/output unit. The plow is adjustable with machine parameters, wherein a portion is manually adjustable and/or automatically adjustable by means of the tractive machine. A plow adjust assistant determines in a dialog with an operator in a plurality of dialog steps, optimized machine parameters of the plow and/or of the tractive machine that are to be adjusted. The plow adjust assistant automatically adjusts a portion of the machine parameters determined in the first dialog step and/or gives the operator a portion for adjusting and determines further optimized machine parameters of the plow based on these machine parameters and gives these further optimized machine parameters of the plow to the operator for adjustment of the plow in a second dialog step and/or automatically adjusts them at the plow.

19 Claims, 2 Drawing Sheets

(51) Int. Cl.
*A01B 63/00* (2006.01)
*A01B 63/24* (2006.01)
*A01B 63/28* (2006.01)

(56) References Cited

U.S. PATENT DOCUMENTS

| | | | |
|---|---|---|---|
| 10,649,641 B2 | 5/2020 | Cabrespine et al. | |
| 2017/0325395 A1* | 11/2017 | Noyer et al. | B60R 16/0236 |
| 2018/0329618 A1 | 11/2018 | Wieckhorst et al. | |
| 2019/0183031 A1 | 6/2019 | Berger et al. | |

FOREIGN PATENT DOCUMENTS

| | | |
|---|---|---|
| EP | 3243368 A2 | 11/2017 |
| EP | 3400767 A1 | 11/2018 |
| EP | 3400769 A1 | 11/2018 |
| EP | 3401195 A1 | 11/2018 |
| EP | 3498066 A1 | 6/2019 |

\* cited by examiner

AGRICULTURAL COMBINATION WITH A TRACTIVE MACHINE AND A PLOW

CROSS-REFERENCE TO RELATED APPLICATIONS

This application claims priority under 35 USC 119 of German Application No. DE 10 2019 122 116.1, filed on Aug. 16, 2019, the disclosure of which is herein incorporated by reference.

BACKGROUND OF THE INVENTION

The invention is directed to an agricultural combination with a tractive machine, particularly a tractor, and a plow and to a driver assistance system for use in the agricultural combination.

High gains in efficiency and/or improvements, for example, with respect to work quality, can be achieved by means of an optimized coordination between the tractive machine and the plow and an optimized adaptation of the tractive machine and plow themselves, particularly with regard to plowing. However, due to the high complexity of the tractive machine and plow, an efficient adjustment requires a high degree of expertise on the part of an operator. In addition, there are a variety of manufacturers of commercial tractive machines and plows, and the implements can usually be combined. As a result, there is a lack of comprehensive optimization systems that can be used for a variety of different plows.

The agricultural combinations known from EP 3 243 367 A2 and EP 3 243 368 A2 are also applicable in this context. It is disclosed in the latter that the tractive machine and a mounted implement, especially a plow, are self-optimizing and that there can be a superordinated process for optimizing to one another. With these agricultural combinations, a first step is taken in the direction of an efficient control of the combination in its entirety. However, not every plow that is fully automated in this way is capable of self-adjustment. On the contrary, it is frequently the case that plows must be manually adjusted by the operator. However, with manual adjustments, machine parameters which are adjusted for the plow are not known to the tractive machine so that these machine parameters can also not be taken into account in the optimization. The tractive machine also has machine parameters which can in turn influence the plow and which are sometimes only manually adjustable.

Further, the agricultural combination must be optimized differently at different times, in different places or at different stages of an agricultural work process. In this regard, previous optimizations sometimes influence future optimizations, some adjustments of machine parameters of the tractive machine and/or of the plow must be carried out at the start of the agricultural work process and cannot always be adjusted again, and diverse adjustments must be carried out in a particular order.

SUMMARY OF THE INVENTION

The problem on which the invention is based is to configure and further develop the known agricultural combination in such a way that the optimization of the combination is improved with respect to its flexibility and efficiency.

This problem is solved in an agricultural combination with a tractive machine, particularly a tractor, and a plow, wherein the tractive machine has a driver assistance system that an input/output unit, wherein the plow and preferably the tractive machine are adjustable with machine parameters for optimizing a cultivation of a field. A portion of the machine parameters of the plow is manually adjustable and/or automatically adjustable by means of the tractive machine, and the driver assistance system comprises a plow adjust assistant for determining and adjusting optimized machine parameters of the plow and preferably of the tractive machine.

It is key that the optimization of the agricultural combination should under no circumstances be carried out independent from an operator. This operator can implement specified strategies, reject or accept certain adjustments suggested in relation to the combination, or the operator can carry out some of the adjustments to be performed. A particularly high efficiency results when the optimization is carried out in a dialog with the operator. This dialog comprises a plurality of dialog steps which sometimes influence one another with respect to their optimizations. For this purpose, the tractive machine has a driver assistance system comprising a plow adjust assistant for determining and adjusting optimized machine parameters of the plow.

In particular, it is suggested that the plow adjust assistant determines in a dialog with an operator, in a plurality of dialog steps, optimized machine parameters of the plow and/or of the tractive machine that are to be adjusted, that the plow adjust assistant automatically adjusts a portion of the optimized machine parameters of the plow and/or of the tractive machine which were determined in a first dialog step and/or gives the operator a portion of the optimized machine parameters determined in the first dialog step to adjust at the plow and/or tractive machine, and that the plow adjust assistant determines further optimized machine parameters of the plow based on the optimized machine parameters determined in the first dialog step or based on actually adjusted machine parameters inputted by the operator in the first dialog step and gives these further optimized machine parameters of the plow to the operator for adjustment of the plow in a second dialog step and/or automatically adjusts them at the plow. Accordingly, the optimized machine parameters of the plow are determined in the second dialog step based on the optimized machine parameters of the first dialog step.

Special importance is attributed to the configuration in which, in the first dialog step, the plow adjust assistant gives the operator optimized machine parameters to be adjusted by the operator. Since many plows cannot currently be adjusted in a fully automated manner and many operators also do not want to buy a new plow in addition to a new driver assistance system or a new tractive machine, the case of the plow not being adjustable in a fully automated manner is a highly important one.

In order for the optimization of a plow which is, at least in part, only manually adjustable to be efficient notwithstanding, the plow adjust assistant in the aforementioned configuration gives the operator the optimized machine parameters which are to be adjusted and which can be adjusted manually on the plow by the operator. The operator can then adjust these machine parameters accordingly or can choose another adjustment. In so doing, it is essential that the operator reports the actual adjustment when this actual adjustment deviates from the specified adjustment. This makes it possible for the plow adjust assistant to take the actual machine parameters into account in the second dialog step during the optimization even though these machine parameters were not adjusted automatically.

Two of the most important machine parameters of the plow which are to be adjusted are the front furrow width and the working depth. Correspondingly, at least these two machine parameters are adjusted automatically in the present invention. In a further preferred embodiment form, the plow adjust assistant adapts the parameters automatically during a cultivation of the field and updates them in particular when they are no longer current as a result of changes in the field crop, field soil or the like.

Certain configurations relate to a "soil characteristics" dialog step and a "travel" dialog step. The "soil characteristics" dialog step is atypical inasmuch as it preferably does not serve directly for the adjustment of machine parameters but rather for the acquisition of pre-stored information which can nevertheless be important for the efficient adjustment of diverse machine parameters. The "travel" dialog step also preferably does not serve directly for the adjustment of machine parameters relating to the cultivation of a field but rather to machine parameters relating to transport of the plow.

Before discussing further possible dialog steps, it should be noted that the dialog steps can be realized in a variety of ways. Accordingly, a dialog step can comprise a plurality of dialog steps, other dialog steps can be executed between the individual dialog steps of a dialog step, and some dialog steps can also be carried out multiple times if necessary.

A "plow attachments" dialog step relates to machine parameters in the form of plow attachments. Such plow attachments can be, for example, skimmers, coulters, disk coulters, subsoilers or compactors. In this regard, it is particularly important that the plow adjust assistant have knowledge of the plow attachments, while the automatic addition or removal of plow attachments by means of the plow adjust assistant is almost impossible. Therefore, this dialog step shows in a simple manner the advantages of the interplay between the plow adjust assistant and the operator.

A "ballasting" dialog step preferably relates to a ballasting of the front axle and/or rear axle of the tractive machine. This has a great influence on the results of plowing, must usually be adjusted even before the commencement of plowing, and is influenced by different parameters simultaneously, particularly the characteristics of the field. Therefore, the advantages of the suggested dialog steps are also evident in this case.

A "tires" dialog step includes a predictive tire plan which in particular takes into account the characteristics of the field such as soil moisture or anticipated future soil moisture can improve the efficiency of the entire agricultural work process.

By means of a "plow type" dialog step, the operator can input parameters of the planned plowing which can in turn have an effect on the machine parameters of the plow.

A "preparation" dialog step preferably comprises a coupling of the plow with the tractive machine and preparations for driving into the field.

A "plow orientation" dialog step involves optimizing a working depth and/or a working width of the plow. This step can usually be executed shortly before driving into the field.

The front furrow width of the plow can be optimally adjusted in particular usually after plowing a first path of the field with the "front furrow width" dialog step.

The "pull point adjustment" dialog step can usually be provided between, shortly after or shortly before the "plow orientation" and "front furrow width" dialog steps. A correct pull point adjustment sets the pull point of the plow so that plowing can be carried out in the most energy-saving manner possible without side pull.

The "coulter" dialog step is directed primarily to adjustments of a coulter and/or of a disk coulter and/or related plow attachments. These adjustments are also important for optimal plowing results.

In one configuration, the plow adjust assistant executes a multistage optimization strategy. The multistage optimization strategy comprises a plurality of stages which relate to the different progressive steps of the agricultural work process.

The dialog steps are associated to specific stages to optimize performance.

The invention also relates to a driver assistance system for use in the suggested agricultural combination. Reference may be made to all of the remarks pertaining to the agricultural combination.

BRIEF DESCRIPTION OF THE DRAWINGS

The invention will be described in more detail in the following referring to drawings in which only one embodiment example is depicted. The drawings show.

DETAILED DESCRIPTION OF THE EMBODIMENTS

Figure 1:
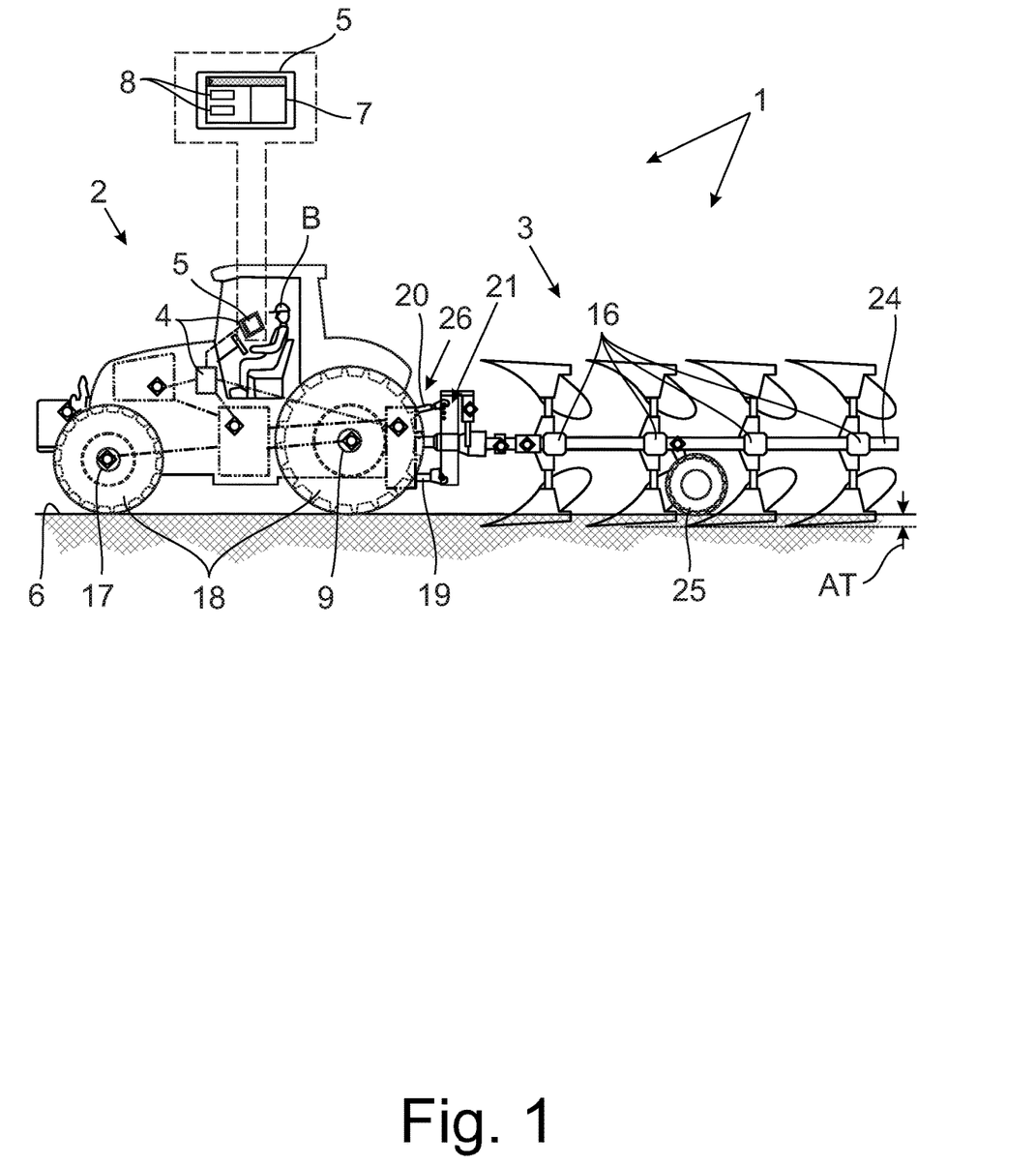
FIG. 1 a suggested agricultural combination with a tractive machine, in this case a tractor, and a plow.

FIG. 1 shows a suggested agricultural combination 1 with a tractive machine 2 formed in the present instance as a tractor, and a plow 3. The tractive machine 2 has a driver assistance system 4. The driver assistance system 4 in turn comprises an input/output unit 5. The input/output unit 5 serves for interaction with an operator B.

The agricultural combination 1 is used within the framework of an agricultural work process for cultivating a field 6. The plow 3 and, in the present instance and preferably, the tractive machine 2 are adjustable with machine parameters for optimizing the cultivation of the field 6. The machine parameters can be a plurality of adjustable parameters which will be addressed in the following. In the present instance and preferably, the tractive machine 2 is also adjustable with machine parameters. The machine parameters can be machine parameters on any level of abstraction in principle. It is also possible that a machine parameter of a higher level of abstraction in turn has an influence on another machine parameter of a lower level of abstraction. To this extent, the term "machine parameter" is to be interpreted broadly. However, it should be emphasized that the machine parameters are directly adjustable parameters which are, in themselves, definitely adjustable, albeit sometimes only by the manufacturer. Accordingly, a strategy such as, for example, "diesel economy" is not a machine parameter. Unless otherwise indicated, the term "machine parameter" always refers to the machine parameters of the tractive machine 2 and/or the plow 3 which are usually considered in company with one another for optimized cultivation of the field 6.

A portion of the machine parameters of the plow 3 is manually and/or automatically adjustable by means of the tractive machine 2. The driver assistance system 4 comprises a plow adjust assistant 7 to determine and adjust optimized machine parameters of the plow 3. This plow adjust assistant 7 is preferably a software program running on the driver assistance system 4. The driver assistance system 4 preferably comprises hardware of the tractive machine 2. However, in an equally advantageous manner it is conceivable that the driver assistance system 4 is or comprises a mobile device. The term "optimized" means an optimization very generally with respect to the agricultural work process, particularly the cultivation of the field 6. For example, an optimization may be a reduction in diesel consumption of the tractive machine 2 or an improved operation of the plow 3, for example, a more thorough mixing of fertilizer in the field 6 or a flatter field surface.

It is suggested that, in a dialog with an operator B in a plurality of dialog steps 8, the plow adjust assistant 7 determines optimized machine parameters of the plow 3 and/or of the tractive machine 2 which are to be adjusted. These optimized machine parameters to be adjusted can be optimized with respect to diverse target specifications. However, an overriding target specification of this optimization will usually be the optimization of the cultivation of the field 6.

It can be provided that the plow adjust assistant 7 automatically adjusts at the plow 3 and/or tractive machine 2 a portion of the optimized machine parameters which are determined in a first dialog step. Additionally or alternatively, it is provided that the plow adjust assistant 7 gives the operator B a portion of the optimized machine parameters determined in the first dialog step for adjusting at the plow 3 and/or tractive machine 2. Insofar as some or even all of the optimized machine parameters are given to the operator B for adjusting at plow 3 and/or tractive machine 2, it is ensured that such machine parameters as are not automatically adjustable can also be optimized by means of the plow adjust assistant 7. When it is stated that the determined optimized machine parameters are given to the operator B for adjusting, this always means that the operator B must adjust these machine parameters manually. However, it need not be the case that the operator B also actually adjusts these machine parameters in the manner specified or even at all. To this extent, the operator B can accept or reject or modify the specified machine parameters and can adjust different machine parameters. In this case, however, it is essential for the unrestricted functioning of the plow adjust assistant 7 that the operator B reports back to the plow adjust assistant 7 by means of the input/output unit 5 about the machine parameters that have actually been adjusted.

It is suggested that the plow adjust assistant 7 determines further optimized machine parameters of the plow 3 based on the optimized machine parameters which are determined in the first dialog step or based on the actually adjusted machine parameters inputted by the operator B in the first dialog step. In a second dialog step, the plow adjust assistant 7 gives these further optimized machine parameters to the operator B for adjusting at the plow 3 and/or automatically adjusts them at the plow 3. The terms "first dialog step" and "second dialog step" are not meant to be limiting with respect to further dialog steps in the dialog. Further dialog steps can be provided before and/or between and/or after the first dialog step and second dialog step.

In the present instance and preferably, the optimized machine parameters are determined in dialog steps 8 based on specifications of the operator B, in particular strategies such as "efficiency" or "diesel economy" as target specifications of the optimization. The dialog can be executed by means of the input/output unit 5 in communication with the operator B.

The dialog steps 8 can relate to progressive steps in the agricultural work process that differ from one another spatially and/or temporally. The optimization of the agricultural combination 1 begins before the cultivation of the field 6 but is effected in its entirety as it relates to the cultivation of the field 6.

It should be particularly emphasized that, by means of the dialog with the operator B, in the present instance and preferably, the plow adjust assistant 7 gives the operator B optimized machine parameters to be adjusted by the operator B. This embodiment form particularly highlights the advantages of the suggested agricultural combination 1 because agricultural combinations 1 with plows 3 in which not all machine parameters of the plow 3 can be adjusted automatically by means of the plow adjust assistant 7 can accordingly also be optimized. It can be provided that the further optimized machine parameters are automatically adjusted at the plow 3 in the second dialog step after the optimized machine parameters to be adjusted have been specified in the first dialog step.

Of the adjustable machine parameters of a plow 3, a working depth AT and a front furrow width VB of the plow 3 are of singular importance. Therefore, in the present instance and preferably, the plow adjust assistant 7 adjusts the front furrow width VB and the working depth AT of the plow 3 automatically at plow 3. This preferably takes place during the second dialog step. Particularly preferably, the plow adjust assistant 7 automatically adapts the front furrow width VB and the working depth AT of the plow 3 during the cultivation of the field 6. In particular, this automatic adaptation is an adjustment which keeps the front furrow width VD and the working depth AT of the plow 3 as constant as possible. However, since an automatic adjustment of this kind is usually impossible in conventional plows 3, it can be provided just as advantageously that the plow adjust assistant 7 gives the operator B auxiliary settings and/or optimized machine parameters for adjusting at the plow 3, by means of which the operator B can adjust the working depth AT and/or the front furrow width VB in an optimized manner.

Figure 2:
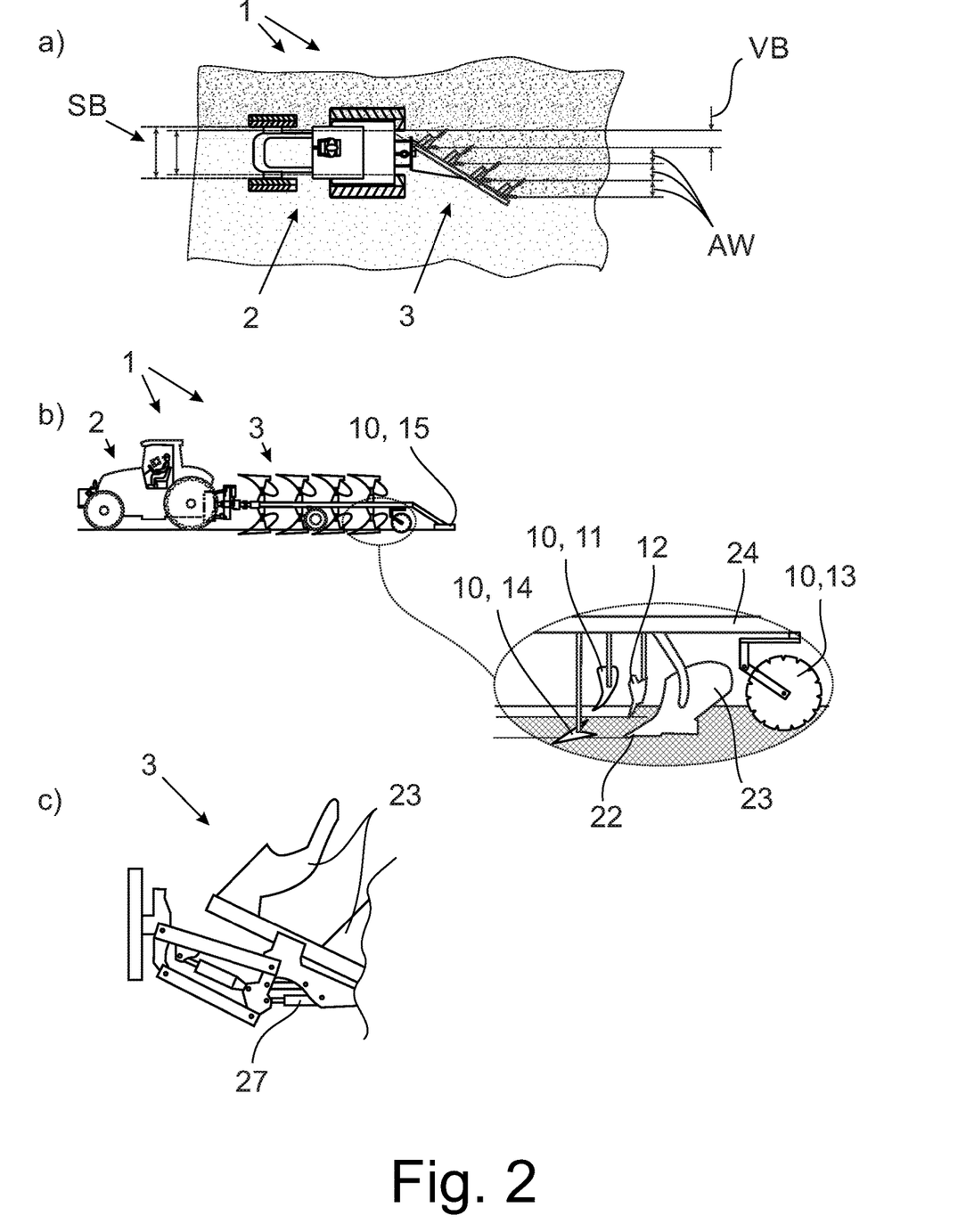
FIG. 2 a tractive machine with a plow and the most important plow attachments thereof in various views a), b), and c).

The various preferred dialog steps 8 of the dialog between plow adjust assistant 7 and operator B will be explained in the following referring to the component parts of a plow 3 shown in different views in FIG. 2. It should be noted here that the term "dialog steps" is to be interpreted in a broad sense. A dialog step 8 comprising a plurality of inputs or prompts can also be divided into a plurality of dialog steps 8, for example. Other dialog steps 8 can be carried out between these dialog steps 8. The sequence of dialog steps 8 is also optional in principle. However, since many of the dialog steps 8 may use information from other dialog steps 8, the latter should preferably be executed beforehand as the case may be. Accordingly, the preferred sequence of dialog steps 8 is determined by the required information. In this respect, however, it is not to be ruled out that the information is also drawn from a source other than a dialog step 8. While this information is obtained in the dialog step, that is, while the latter is being executed, it is not obtained through the execution of the dialog step.

The dialog of the plow adjust assistant 7 can comprise a "soil characteristics" dialog step in which the operator B inputs characteristics of the field 6 and/or in which characteristics of the field 6 are automatically detected. These characteristics of the field 6 can be mapping data of a field file, forecast weather data on the site of the field 6, soil moisture, and so forth. The characteristics of the field and, very generally, also machine parameters can be determined in the other dialog steps not only through operator input but also from external sources. In this case, it can be provided that the mapping data of the field file and/or the weather data are evaluated automatically in the "soil characteristics" dialog step to detect the characteristics of the field 6.

It can be provided that the dialog of the plow adjust assistant 7 comprises a "travel" dialog step in which the operator B can select road travel and/or field cultivation as parameter. Thereupon, the plow adjust assistant 7 automatically adjusts road travel-specific and/or field cultivation-specific machine parameters at the plow 3 and/or gives them to the operator B for adjustment. Therefore, "road travel" and "field cultivation" are not machine parameters but rather are more general parameters. However, more general parameters of this kind are useable equivalent to the machine parameters of the further dialog steps, and all of the remarks pertaining to machine parameters, except for direct adjustability, are also applicable to other, more general parameters.

The road travel-specific machine parameters can relate to a locking of a transport position with a semi-mounted plow, for example, since the latter should not engage with the ground during road travel. This adjustment should then be reversed for field cultivation. The activation of a lock to prevent lowering of the plow 3, for example, is contemplated as further road travel-specific machine parameter. The plow adjust assistant 7 can also adjust machine parameters of the tractive machine 2 in the "travel" dialog step. The road travel-specific and field cultivation-specific machine parameters can have been stored in the driver assistance system by the manufacturer; plow-specific machine parameters can have been received from a server or inputted, particularly stored once, by the operator.

The dialog of the plow adjust assistant 7 can comprise a "plow attachments" dialog step in which optimized plow attachments 10 for the plow 3 are given to the operator B as machine parameters and/or the operator B can input mounted plow attachments 10 as machine parameters. Such plow attachments 10 are preferably skimmers 11 and/or coulters 12 and/or disk coulters 13 and/or subsoilers 14 and/or compactors 15. In the present case and preferably, the optimized plow attachments 10 for the plow 3 are determined in the "plow attachments" dialog step based on the characteristics of the field 6 that are inputted in the "soil characteristics" dialog step and/or detected automatically. For example, the need for a subsoiler 14 can be assessed based on data pertaining to the firmness of the subsoil.

In this present instance and preferably, optimized machine parameters of a hydraulic overload protection 16 are determined from the field characteristics determined in the "soil characteristics" dialog step and/or from the machine parameters determined and/or given in the "plow attachments" dialog step. In the present instance and preferably, this determination is also part of the "plow attachments" dialog step and is correspondingly given to the operator B for adjustment or adjusted automatically.

The dialog of the plow adjust assistant 7 can comprise a "ballasting" dialog step in which optimized ballasts for the front axle 17 and/or the rear axle 9 of the tractive machine 2 are given to the operator B as machine parameters, and/or the operator B can input ballasts for the front axle 17 and/or the rear axle 9 of the tractive machine 2 and/or the use of a rear axle ballasting as machine parameters. Since the plow 3 acts as a lever on the tractive machine 2, usually from the rear, during the plowing of field 6, a ballasting of the front axle 17 can counteract this lever. However, depending on the configuration of the agricultural combination 1, particularly the tractive machine 2, a minimum axle load increase of the rear axle 9 may also be necessary, which must also be taken into account. Accordingly, the optimized ballasts are preferably determined based on the inputted use of the rear axle ballasting and/or the characteristics of the field 6 inputted in the "soil characteristics" dialog step and/or the automatically detected characteristics of the field 6 and/or a goal of the plowing. Accordingly, the ballasting can depend on the soil moisture, for example. Additionally or alternatively, the optimized ballasting can be determined based on the machine parameters inputted and/or given in the "plow attachments" dialog step. Accordingly, for example, the ballasting in a plow 3 with a compactor 15 differs from the ballasting in a plow 3 without a compactor 15. The goal of plowing can be, for example, the production of a seed bed.

The dialog of the plow assistant 7 can comprise a "tires" dialog step in which optimized tire parameters, particularly a tire pressure, are given to the operator B as machine parameters and/or the operator B can input tire parameters as machine parameters.

In the present instance and preferably, the "tires" dialog step is divided into a "tire type" dialog step and a "tire pressure" dialog step. The "tire type" dialog step comprises a type of tire 18 of the tractive machine 2, for example, a tread depth, and the "tire pressure" dialog step concerns the pressure of the tires 18. While the type of tire 18 is usually adjusted only one time for an agricultural work process, it can be provided that the tire pressure is changed multiple times, for example, prior to road travel and prior to the start of cultivation of the field 6.

The optimized tire parameters are preferably determined based on the characteristics of the field 6 which are inputted in the "soil characteristics" dialog step and/or which are automatically detected and/or based on the machine parameters which are inputted and/or given in the "ballasting" dialog step. Additionally or alternatively, it can be provided that the optimized machine parameters are determined in the "ballasting" dialog step based on the optimized or inputted machine parameters of the "tires" dialog step. Accordingly, the type of tire 18 is preferably inputted first, and the optimized ballasts are then determined, and then the optimized tire pressure.

The dialog of the plow adjust assistant 7 can comprise a "plow type" dialog step in which the operator B can input parameters of the planned plowing. The parameters of the planned plowing which can be inputted preferably include whether the plowing is carried out onland or offland and/or whether or not a compactor 15 is used and/or whether a seed furrow or a winter furrow is plowed. Insofar as the information about whether or not a compactor 15 is used is already known, it can be specified again in this instance for control purposes.

During onland plowing, the tractive machine 2 drives entirely on unplowed land, whereas during offland plowing one side of the tractive machine 2 drives in an already plowed furrow. Correspondingly, this parameter has a great influence on most machine parameters.

The dialog of the plow adjust assistant 7 can comprise a "preparation" dialog step in which an optimal axle spacing, in particular the track width SB of the rear axle 9, is given to the operator B as machine parameter and/or the operator B can input an axle spacing as machine parameter. Additionally or alternatively, optimized machine parameters for lower links 19 and/or for upper links 20 can be given to the operator B and/or the operator B can input machine parameters of the lower links 19 and/or upper links 20. It is preferably at least specified as optimized axle spacing that the axle spacing of the front axle 17 and rear axle 9 diverge from one another by a maximum of 10 cm. By axle spacing is meant the distance between the inner tire edges of the respective axle.

In the present instance and preferably, adjustments of the lower links 19 and/or upper links 20 are given to the operator by the plow adjust assistant 7 for adjustment by the operator. Alternatively, the lower links 19 and/or the upper links 20 can be adjusted by the plow adjust assistant 7 automatically or semi-automatically to the optimized machine parameters determined in the "preparation" dialog step. Additionally or alternatively, the optimized machine parameters of the "preparation" dialog step are determined based on the inputted parameters of the "plow type" dialog step.

The machine parameters for the upper links 20 preferably comprise an orientation of the upper links 20, a height adjustment of the point of application of the upper links 20 at the rail shaft 21, the hole in the rail shaft 21 that is to be utilized as point of application and/or a length adjustment of the upper links 20. During the length adjustment of the upper links 20, it is preferably specified that the latter are to be put under tension. The adjustments of the lower links 19 also preferably comprise at least the orientation of the lower links 19.

It is preferably conveyed to the operator B as machine parameter in the "preparation" dialog step that the upper links 20 are to engage in an elongated hole of the rail shaft 21 insofar as it is known from the "soil characteristics" dialog step that the field 6 is hilly. The optimized machine parameters of the lower links 19 and/or upper links 20 in the present instance and preferably are dependent on whether an onland plowing or an offland plowing was inputted in the "plow type" dialog step. In the "preparation" dialog step, it can also be conveyed to the operator B as machine parameter that hydraulics of the tractive machine 2 should be set to position power, mixed power or tractive power.

The dialog of the plow adjust assistant 7 can comprise a "plow orientation" dialog step in which an optimized working depth AT and/or an optimized working width AW are given to the operator B as machine parameters and/or in which the operator B can input a working depth AT and/or a working width AW as machine parameter. The working depth AT is the depth of penetration of a share point 22, and the working width AW is the distance of the shares 23 from one another transverse to the plowing direction. Optimized machine parameters of the plow 3, particularly an angle of inclination of the plow 3 and an articulation point for the upper links 20 and preferably adjusting aids for optimized adjustment of the settings of the plow 3, particularly controlling elements to be adjusted in each instance, which were preferably determined based on the machine parameters inputted and/or given in the "plow orientation" dialog step are preferably given to the operator B in the "plow orientation" dialog step.

In the present case, the above-mentioned controlling elements to be adjusted can be, for example, the upper link length by means of which kinematics of the plow 3 can be influenced. Very generally, the controlling elements should be adjusted such that an angle of inclination of a plow beam 24 is adjusted in such a way that the plow beam 24 is parallel to the ground. The working depth AT should be selected depending on the characteristics of the field 6, particularly the soil moisture, and/or on a soil type and/or on a goal of the field cultivation so that it is preferably determined by the plow adjust assistant 7 depending on the characteristics of the field 6. Serving to adjust the working depth AT are the machine parameters of the tractor hydraulics and the machine parameters of a depth wheel 25 of the plow 3 which are preferably adjusted automatically and/or are given to the operator B for adjustment. Further machine parameters of the "plow orientation" dialog step can be adjustments of a three-point linkage 26, a lift height-dependent locking of side struts, and so forth.

The dialog of the plow adjust assistant 7 can comprise a "front furrow width" dialog step in which the operator B can input, as machine parameter, a manufacturer of the plow 3 and/or information on the mechanics of the plow 3 and/or an adjustability of the plow 3, particularly hydraulic or mechanical adjustability, and/or a quantity of shares 23 of the plow 3. In the present instance and preferably, it is provided that optimized adjustments of the plow 3 for front furrow width VB and preferably adjusting aids for optimized adjustment of the front furrow width VB of the plow 3, particularly a measurement method and/or controlling elements to be adjusted, which were preferably determined based on the machine parameters inputted in the "front furrow width" dialog step are given to the operator B as machine parameters in the "front furrow width" dialog step. In particular, an inner spindle 28 of the plow 3 is contemplated as controlling element to be adjusted in the adjustment of the front furrow width VB. This can be a hydraulic cylinder which is preferably adjusted by the plow adjust assistant 7 automatically or by the operator B by remote power, or can be a mechanical spindle which is to be adjusted by the operator B. As is shown in FIG. 2a), the front furrow width VB is the distance between the last furrow of the plowed path next to the current path to be plowed and the first furrow of the current path.

The dialog of the plow adjust assistant 7 can comprise a "pull point adjustment" dialog step in which the operator B can input, as machine parameter, a manufacturer of the plow 3 and/or information on the mechanics of the plow 3 and/or an adjustability of the plow 3, particularly hydraulic or mechanical adjustability, and/or a quantity of shares 23 of the plow 3. It is preferably the case that an optimized adjustment of the plow 3 for pull point adjustment and preferably adjusting aids for optimized adjustment of the pull point of the plow 3, particularly controlling elements to be adjusted, which were preferably determined based on the machine parameters inputted and/or specified in the "pull point adjustment" dialog step and/or in the "front furrow width" dialog step are given to the operator in the "pull point adjustment" dialog step.

In the present instance and preferably, the machine parameters of the "pull point adjustment" dialog step are adjusted in such a way that the tractive machine has a slight side pull in direction of the plowed field 6 or no side pull. These machine parameters are preferably adjusted automatically.

Insofar as the plow 3 itself supports an automatic adjustment of the front furrow width VB and/or pull point, this can be taken into account by the plow adjust assistant 7.

The dialog of the plow adjust assistant 7 can comprise a "coulter" dialog step in which optimized machine parameters of a coulter 12 and/or of a disk coulter 13, particularly a coulter depth and/or a disk coulter depth, and/or of a wide furrow knife and/or of a subsoiler 14 and/or a lateral distance of the disk coulter 13 of the share point 22 are given to the operator B. Additionally or alternatively, in the "coulter" dialog step the operator B can input machine parameters of a coulter 12 and/or of a disk coulter 13, particularly a coulter depth and/or a disk coulter depth, and/or of a wide furrow knife and/or of a subsoiler 14 and/or a lateral distance of the disk coulter 13 from the share point 22. In the present instance and preferably, the subsoiler 14 is a subsoiler spike. An example of a machine parameter which is to be adjusted automatically based on the machine parameters of the "coulter" dialog step is an anti-reverse lock of the tractive machine 2 when a disk coulter 13 is used.

In the present instance and preferably, the plow adjust assistant 7 executes, by means of the dialog, a multistage optimization strategy with differing stages and target specifications. In the present instance and preferably, the multistage optimization strategy comprises a first stage, "in the farmyard", in which a target specification is the optimization of a basic configuration of the tractive machine 2, a second stage, "by the field", in which a target specification is the optimization of a plow-specific configuration of the tractive machine 2 and of a configuration of the plow 3, and a third stage, "in the field", in which a target specification is the adaptation of the basic configuration and of the mounted implement-specific configuration during the cultivation of the field 6. In the present instance and preferably, the stages differ with respect to the progress of the agricultural work process which is defined by the tasks to be carried out by the agricultural combination 1 and/or by the location where they are executed.

These stages can be associated with different dialog steps 8. In the present instance and preferably, the "soil characteristics" dialog step and/or the "ballasting" dialog step and/or the "tires" dialog step and/or the "travel" dialog step and/or the "plow attachments" dialog step is/are associated with the first stage. Additionally or alternatively, the "plow type" dialog step and/or "preparation" dialog step and/or "plow orientation" dialog step and/or "front furrow width" dialog step and/or "pull point adjustment" dialog step and/or "coulter" dialog step is/are associated with the second stage.

In order that the operator B is not distracted by the dialog in the third stage during the cultivation of the field 6, it can be provided that machine parameters of the "soil characteristics" dialog step and/or "ballasting" dialog step and/or "tires" dialog step and/or "plow type" dialog step and/or "preparation" dialog step and/or "plow orientation" dialog step and/or "front furrow width" dialog step and/or "pull point adjustment" dialog step and/or "coulter" dialog step which are inputted and/or specified in the third stage are used to optimize further machine parameters. This optimization is then carried out preferably by means of the driver assistance system 4 at least partially without the help of the operator B.

In the present instance and preferably, it is the case that the stages differ with respect to a progress of the agricultural work process. The term "progress" relates to different tasks of the agricultural combination 1 during the agricultural work process. The first stage is then preferably associated with a start of the execution of the agricultural work process, and the tractive machine 2 is not yet coupled with the plow 3 in the first stage. Additionally or alternatively, the second stage is preferably associated with the coupling of the tractive machine 2 with the plow 3. Further additionally or alternatively, the third stage is preferably associated with the use of the plow 3 in the cultivation of the field 6.

In the present instance and preferably, the stages are associated in each instance with a location area relative to the field 6. It is then preferably the case that the first stage is associated with a location area remote from the field 6, preferably in a farmyard. Additionally or alternatively, the second stage is preferably associated with a location area by the field 6. Also additionally or alternatively, the third stage can be associated with a location area in the field 6.

In the preferred embodiment form, the first stage relates to the optimization of the basic configuration, particularly in the farmyard, at the start of the execution of the agricultural work process. Accordingly, the operator B can adjust a variety of machine parameters even before driving off with the tractive machine 2. The plow adjust assistant 7 can adapt further machine parameters to an imminent road travel and the daily schedule. The operator B then preferably drives to the field 6. In this case, the tractive machine 2 can already be coupled with the plow 3 but particularly so as only to carry the plow 3.

The second stage preferably relates to an adjustment of machine parameters on the plow 3 or a coupling with the plow 3 and an adjustment of machine parameters at plow 3. Accordingly, machine parameters which were previously adapted to a road travel can be adjusted in the second stage. The operator B preferably drives with the tractive machine 2 into the field 6 after concluding the optimizations of the second stage and begins to cultivate the field 6.

As used herein, the term "coupling" refers to an at least mechanical connection between the tractive machine 2 and the plow 3, particularly by means of the three-point linkage 26.

According to a further teaching to which an independent status is attributed, a driver assistance system 4 for use in the suggested agricultural combination 1 is claimed. All of the remarks pertaining to the agricultural combination 1 may be referred to. The driver assistance system 4 comprises at least one automated plow adjustment system 7 which can include the functions already described above and particularly dialog steps 8. Since the automated plow adjustment system 7 is preferably a software program, the driver assistance system 4 is preferably adapted to execute the automated plow adjustment system 7.

REFERENCE CHARACTERS 1 agricultural combination
2 tractive machine
3 plow
4 driver assistance system
5 input/output unit
6 field
7 plow adjust assistant
8 dialog steps
9 rear axle
10 plow attachments
11 skimmer
12 coulter
13 disk coulter
14 subsoiler
15 compactor
16 hydraulic overload protection
17 front axle
18 tire
19 lower link
20 upper link
21 rail shaft
22 share point
23 share
24 plow beam
25 depth wheel
26 three-point linkage
27 inner spindle
B operator
VB front furrow width
AT working depth
SB track width
AW working width

What is claimed is:

1. An agricultural combination comprising:
a tractive machine having a driver assistance system with an input/output unit, and
a plow, wherein the plow and the tractive machine are configured for adjustment with machine parameters for optimizing a cultivation of a field,
wherein a portion of the machine parameters of the plow is manually adjustable and/or automatically adjustable by means of the tractive machine, and
wherein the driver assistance system comprises a plow adjust assistant configured to serially perform optimization stages comprising at least one initial optimization stage followed by at least one subsequent optimization stage:
in the at least one initial optimization stage:
determine one or more initial stage optimized machine parameters for one or both of the tractive machine or the plow, the one or more initial stage optimized machine parameters in order to optimize the one or both of the tractive machine or the plow of one of optimization of a configuration of the tractive machine, of optimization of a configuration of the plow, or of optimization of a plow-specific configuration of the tractive machine in which the tractive machine is coupled to the plow; and
perform at least one of:
output, to an operator, the one or more initial stage optimized machine parameters in at least one initial dialog step for at least partly manual input by the operator; or
automatic implementation of the one or more initial stage optimized machine parameters;
in the at least one subsequent optimization stage performed after the at least one initial optimization stage and dependent on the one or more initial stage optimized machine parameters determined in the at least one initial optimization stage:
determine, using the one or more initial stage optimized machine parameters determined in the at least one initial optimization stage, one or more subsequent stage optimized machine parameters for the plow, the one or more subsequent stage optimized machine parameters for implementation in order to optimize the plow as the plow, when coupled to the tractive machine, is cultivating a field; and
perform at least one of:
output, to the operator, the one or more subsequent stage optimized machine parameters in at least one subsequent dialog step for at least partly manual input by the operator; or
automatic implementation of the one or more subsequent stage optimized machine parameters.

2. The agricultural combination according to claim 1, wherein, in the at least one initial optimization stage, the agricultural combination is configured to implement the one or more initial stage optimized machine parameters by:
in the at least one initial dialog step with the operator, the plow adjust assistant is configured to automatically output to the operator the one or more initial stage optimized machine parameters to be adjusted by the operator.

3. The agricultural combination according to claim 1, wherein the one or more subsequent stage optimized machine parameters comprise a front furrow width and a working depth of the plow; and
wherein the plow adjust assistant is configured to automatically adjust a front furrow width and a working depth of the plow automatically at the plow and automatically adapt the front furrow width and the working depth during the cultivation of the field.

4. The agricultural combination according to claim 1, wherein, in the at least one initial optimization stage, soil characteristics are input by the operator or are automatically detected; and
wherein, in the at least one initial optimization stage, the plow adjust assistant is configured to determine the one or more initial stage optimized machine parameters based on the soil characteristics.

5. The agricultural combination according to claim 4, wherein the one or more initial stage optimized machine parameters comprise one or more optimized tire parameters or optimized ballasting.

6. The agricultural combination according to claim 4, wherein, in the at least one subsequent optimization stage, the plow adjust assistant is configured to determine the one or more subsequent stage optimized machine parameters based on the soil characteristics; and
wherein, responsive to the soil characteristics being input by the operator or being automatically detected, the plow adjust assistant is configured in the at least one subsequent optimization stage to generate optimized plow attachments for the plow.

7. The agricultural combination according to claim 1, wherein the plow adjust assistant further comprises a travel dialog step in which:
operator input is indicative of road travel or field travel; and
responsive to the operator input being indicative of the road travel, the plow adjust assistant is configured to:
automatically adjust to road travel machine parameters of the plow; or
output one or more road-travel specific parameters for configuration by the operator.

8. The agricultural combination according to claim 1, further comprising a mechanical linkage between the tractive machine and the plow comprising upper links and lower links;
wherein the at least one subsequent optimization stage comprises a plow type dialog step in which the operator inputs one or more planned plowing parameters; and
wherein, in the at least one subsequent optimization stage, the plow adjust assistant is configured to determine one or both of the upper links or the lower links of the agricultural combination.

9. The agricultural combination according to claim 8, wherein the plow type dialog step includes one or more of: whether the plowing is carried out onland or offland; whether or not a compactor is used; or whether a seed furrow or a winter furrow is plowed.

10. The agricultural combination according to claim 8, wherein the plow adjust assistant further comprises a preparation dialog step in which:
optimal axle spacing is output to the operator as machine parameter; and
optimized adjustments for the one or both of lower links or for upper links are output to the operator or automatically implemented by the plow adjust assistant.

11. The agricultural combination according to claim 1, wherein the at least one subsequent optimization stage comprises a plow orientation dialog step in which the plow adjust assistant is configured to generate one or both of optimized working depth of the plow or optimized working width of the plow.

12. The agricultural combination according to claim 1, wherein the tractive machine is configured to plow a plowed field; and
wherein the plow adjust assistant in the at least one subsequent optimization stage is configured to generate one or more pull point adjustments that automatically adjusts the tractive machine in such a way that the tractive machine has a side pull in a direction of the plowed field or no side pull.

13. The agricultural combination according to claim 1, wherein, in the at least one initial optimization stage, the plow adjust assistant is configured to determine the one or more initial stage optimized machine parameters for the plow; and
wherein, in the at least one subsequent optimization stage, the plow adjust assistant is configured to determine the one or more subsequent stage optimized machine parameters for the plow.

14. The agricultural combination according to claim 13, wherein the one or more initial stage optimized machine parameters for the plow are different from the one or more subsequent stage optimized machine parameters for the plow; and
wherein the one or more subsequent stage optimized machine parameters for the plow comprise both an optimized working depth and an optimized working width.

15. The agricultural combination according to claim 1, wherein, the one or more subsequent stage optimized machine parameters are for implementation after connecting the plow and the tractive machine together.

16. The agricultural combination according to claim 1, wherein the at least one initial optimization stage is in a farmyard in which a target specification is an optimization of a configuration of the tractive machine or by the field in which the target specification is the optimization of a plow-specific configuration of the tractive machine and a configuration of the plow; and
wherein the at least one subsequent optimization stage is in the field in which the target specification is an optimization of one or both of a front furrow width of the plow or a working depth of the plow.

17. The agricultural combination according to claim 16, wherein the at least one initial optimization stage comprises a first initial optimization stage in a farmyard in which the target specification is the optimization of the configuration of the tractive machine; and
wherein the at least one initial optimization stage comprises a second initial optimization stage by the field in which the target specification is the optimization of the plow-specific configuration of the tractive machine and the configuration of the plow.

18. The agricultural combination according to claim 1, wherein the at least one initial optimization stage comprises one or both of a first stage where the tractive machine is not yet coupled to the plow or a second stage where the tractive machine is coupled to the plow but prior to cultivation of the field;
wherein the driver assistance system is configured to output or automatically implement the one or more initial stage optimized machine parameters prior to performing the at least one subsequent optimization stage; and
wherein the at least one subsequent optimization stage comprises a third stage performed at least partly while using the plow, when coupled to the tractive machine for use of the one or more subsequent stage optimized machine parameters for the plow, to cultivate the field.

19. A driver assistance system for use in an agricultural combination formed by a tractive machine and a plow, the driver assistance system comprising a plow adjust assistant configured to serially perform optimization stages comprising at least one initial optimization stage followed by at least one subsequent optimization stage:
in the at least one initial optimization stage:
determine one or more initial stage optimized machine parameters for one or both of the tractive machine or the plow, the one or more initial stage optimized machine parameters in order to optimize the one or both of the tractive machine or the plow of one of optimization of a configuration of the tractive machine, of optimization of a configuration of the plow, or of optimization of a plow-specific configuration of the tractive machine in which the tractive machine is coupled to the plow; and
perform at least one of:
output, to an operator, the one or more initial stage optimized machine parameters in at least one initial dialog step for at least partly manual input by the operator; or
automatic implementation of the one or more initial stage optimized machine parameters;
in the at least one subsequent optimization stage performed after the at least one initial optimization stage and dependent on the one or more initial stage optimized machine parameters determined in the at least one initial optimization stage:
determine, using the one or more initial stage optimized machine parameters determined in the at least one initial optimization stage, one or more subsequent stage optimized machine parameters for the plow, the one or more subsequent stage optimized machine parameters for implementation in order to optimize the plow as the plow, when coupled to the tractive machine, is cultivating a field; and
perform at least one of:
output, to the operator, the one or more subsequent stage optimized machine parameters in at least one subsequent dialog step for at least partly manual input by the operator; or
automatic implementation of the one or more subsequent stage optimized machine parameters.

* * * * *